United States Patent

[11] 3,584,180

[72] Inventor Richard A. Trepanier
 509 Howard St., Elmhurst, Ill. 60126
[21] Appl. No. 800,625
[22] Filed Feb. 19, 1969
[45] Patented June 8, 1971

[54] WELDING TORCH
 8 Claims, 4 Drawing Figs.
[52] U.S. Cl..................................................... 219/74,
 219/130
[51] Int. Cl...................................................... B23k 9/16,
 B23k 9/00
[50] Field of Search.......................................... 219/74, 130

[56] References Cited
 UNITED STATES PATENTS
 3,155,811 11/1964 Adamson et al.............. 219/130
 3,283,121 11/1966 Bernard et al................ 219/130
 3,496,328 2/1970 Moerke........................ 219/130

*Primary Examiner*—J. V. Truhe
*Assistant Examiner*—L. H. Bender

*Attorneys*—Ronald L. Engel, Daniel W. Vittum, Jr. and Gomer W. Walters

ABSTRACT: An improved metal inert gas welding torch includes a longitudinal casing and a working tip extending from one end of the longitudinal casing at an angle of less than about 90° with the working tip including an annular chamber defining member connected to the longitudinal casing and spacer means disposed in the annular chamber defining member in order to define first and second chambers. Contact means joined to the chamber defining member include an axial center opening. A tube passes through the longitudinal casing into the chamber defining member and communicates with the second member formed by the said member, with the tube being adapted to permit welding wire to be sequentially advanced therethrough. The tube is further adapted to admit an inert gas to the second chamber formed by the chamber defining member and then through the opening in the contact means so as to provide an inert gas shield at the point at which the weld is formed. Coolant circulating means provide a continuous circulating flow of coolant into and out of the first chamber, and switch means are disposed within the longitudinal casing, with switch actuator means projecting out of the casing.

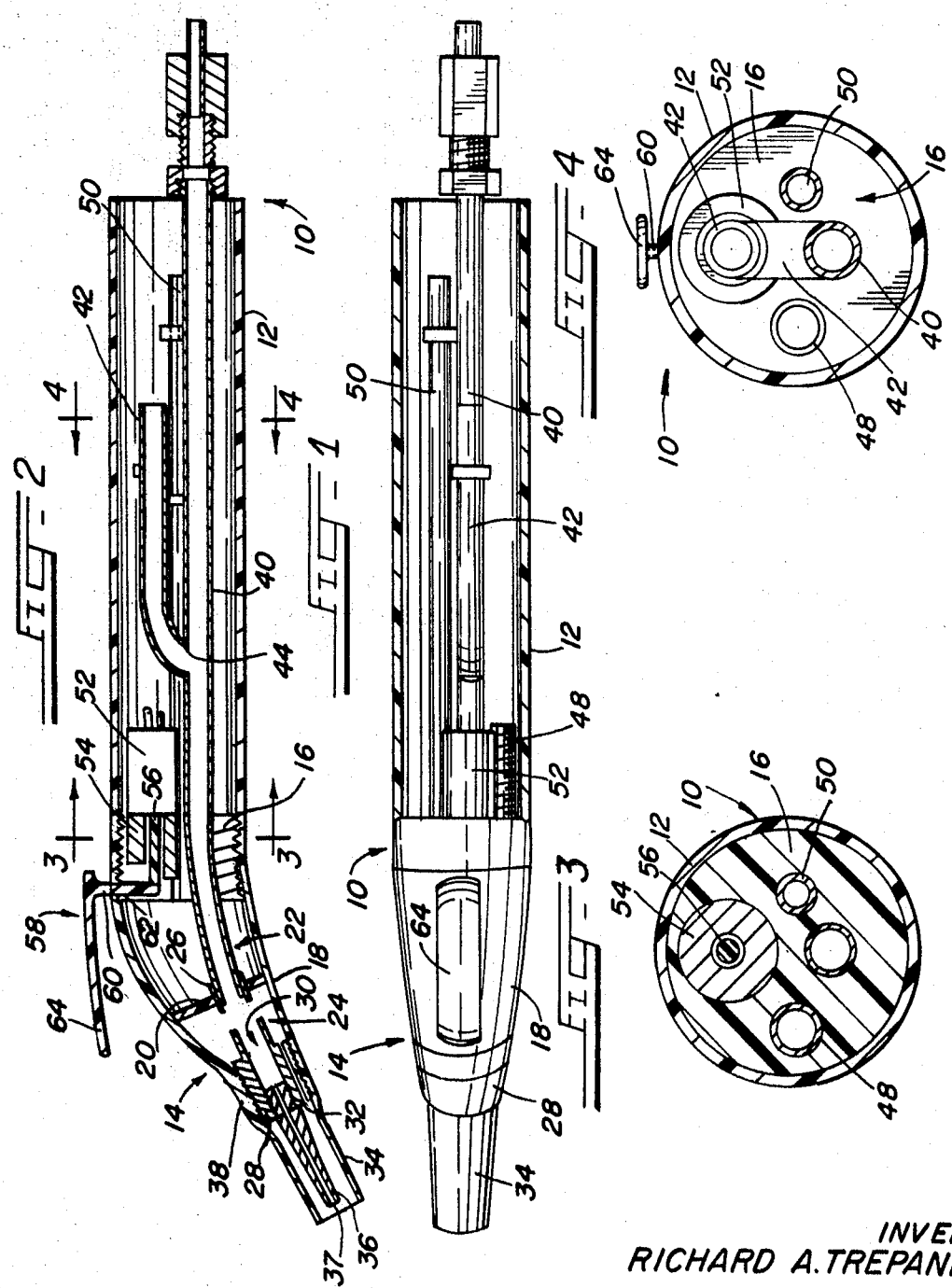
INVENTOR.
RICHARD A. TREPANIER

WELDING TORCH

BACKGROUND OF THE INVENTION

1. Field of the Invention

The present invention relates to welding torches and in particular to a miniaturized metal inert gas welding torch that can be easily held and operated in one hand.

2. Description of the Prior Art

Prior art metal inert gas welding torches have been bulky and cumbersome and typically have involved casings provided with external electrical switches which are displaced from the working tip by a curved tubing which passes through substantially a 90° angle. Such devices are bulky and cumbersome and two hands must be employed to maneuver such devices. As a result, the workpieces to be welded must be separately positioned and maintained in place.

Accordingly, it is an object of the present invention to provide a metal, inert gas welding torch of a miniaturized nature and of such design that it can be held and maintained and operated in one hand only, leaving the other hand free to maneuver the pieces to be welded.

A further object is to provide a metal inert gas welding torch of the character described which is vastly smaller than prior art torches and yet which is provided with liquid coolant whereby it may be employed with higher temperature welding environments.

A further object is to provide a metal inert gas welding torch which may be used on very thin gauged materials and on metal such as aluminum.

Yet another object is to provide a metal inert gas welding torch of the character described which may be used where heliarc welding techniques had previously been the only available means.

SUMMARY OF THE INVENTION

The foregoing and other objects, advantages, and features of the present invention may be achieved with a metal inert gas welding torch comprising a longitudinal casing and a working tip extending from one end of the longitudinal casing at an angle of less than about 90°, with the working tip including: an annular chamber defining member connected to the longitudinal casing; spacer means disposed in the annular chamber defining members so as to define first and second chambers; and contact means joined to the chamber defining member and having a center opening communicating with the second chamber. A tube passes through the longitudinal casing and annular chamber defining member and communicates with the second chamber, with the tube being adapted to permit welding wire to be sequentially advanced therethrough and through the center opening in the contact means to the point at which the weld is to be formed, said tube being further adapted to admit an inert gas to the second chamber and through the center opening in the contact means so as to provide an inert gas shield at the point at which the weld is formed. Coolant circulating means are adapted to provide a continuous circulating flow of coolant into and out of the first chamber, and switch means are disposed within the longitudinal casing, with switch actuator means projecting out of the casing and having a forwardly projecting actuator lever portion and with the switch means being provided with a source of electrical current.

DESCRIPTION OF THE DRAWINGS

FIG. 1 is a top view, partially in section, of a metal inert gas welding torch produced in accordance with the present invention;

FIG. 2 is a vertical sectional view taken through the center thereof;

FIG. 3 is a sectional view taken along line 3–3 in FIG. 2; and

FIG. 4 is a sectional view taken substantially along line 4–4 in FIG. 2.

DETAILED DESCRIPTION OF THE PREFERRED EMBODIMENTS

FIGS. 1–4 illustrate a metal inert gas welding torch 10 produced in accordance with the present invention. Torch 10 includes a longitudinal casing 12 and a working tip 14. Longitudinal casing 12 is hollow, preferably takes the form of a cylinder, although other geometric configurations may of course be employed. Casing 14 is formed of suitable heat resistant plastic such as fibra-fill. Working tip 14 extends forwardly from casing 12 at an angle of less than 90°, preferably about 30—45°, as best shown in FIG. 2. A spacer 16 is attached to the end of casing 12 adjacent working tip 14, as by threading, and working tip 14 is threaded onto spacer 16 in a manner that will be described in detail hereinafter.

Working tip 14 comprises an annular chamber defining member 18 of diminishing diameter. The said member is hollow and preferably is formed of the same heat resistant plastic material as casing 12. The interior of the larger diameter end of annular member 18 is preferably inwardly threaded so as to permit it to be threaded onto spacer 16 whereby to attach member 18 to casing 12 (see FIG. 2).

Member 18 is hollow and is provided with a spacer member 20 positioned substantially centrally thereof so as to divide the interior thereof into a first or coolant chamber 22 and a second or inert gas chamber 24. A center opening is provided in spacer 20 and a bushing 26 is force fitted into spacer 20 for a purpose that will hereinafter appear. The lower, smaller diameter portion of member 18 is closed off by a contact tip holder 28 which is provided with an axial center opening 30 and a plurality of radially positioned auxiliary openings 32. A nonconductive shielding cup 34 is externally threaded onto the projecting portion of holder 28 and a contact tip 36 is inwardly threaded in the axial center opening 30 of holder 28. Contact tip 36 has an axial center opening 37, the diameter of which varies with the diameter of the welding wire employed.

A tube 40 passes longitudinally through the casing 12 and curves through a curved opening in spacer 16 and terminates in bushing 26. The end of tubing 40 in bushing 26 is axially aligned with the center opening in holder 28 which is provided with an upwardly extending annular flange 38. As a result, a welding wire (not shown) of suitable metal such as any commercially manufactured Mig welding wire (e.g., aluminum, stainless steel, and mild steel) is passed through tubing 40 and the opening 30 in holder 28 so as to contact the workpiece (not shown). Mechanical means (also not shown) are provided for sequentially advancing the wire through tubing 40 toward the workpiece as the wire is consumed. An inert gas inlet tube 42 is joined to tubing 40 at point 44 so that a suitable inert gas (such as argon, $CO^2$, or a combination of gases depending on the type of material being welded) may be forced under pressure through tubing 42 and tubing 40 into the second chamber 24 from which it flows through the center opening and the auxiliary radial openings so as to provide a shield about the weld joint so as to keep oxygen away from the joint being formed.

A water inlet tubing 48 (see FIGS. 3 and 4) is provided in casing 12 and passes through an opening in spacer 16 so as to provide fluid communication with the first chamber 22. Tubing 48 provides an inlet passage for cooling fluid to chamber 22. A tubing 50 (see FIGS. 3 and 4) is similarly provided and passes through an opening in spacer 16 so as to provide a fluid outlet from chamber 22. Thus, liquid coolant, such as water for example, may be continuously circulated through chamber 22 so as to provide and cool working tip 14 during the operation of the welding torch.

A miniature switch 52 is provided within casing 12, and spacer 16 is cut away so as to provide room for a bushing 54 with a center opening to be force-fitted therein. A pin 56 is slidably fitted within the opening in bushing 54 and one end thereof bears against the spring biased, normally opened contact of switch 52. An actuator 58 for switch 52 comprises a vertical lever 60 pivotally mounted about a pin 62, with the lower end of lever 60 bearing against pin 56. A finger actuated, forwardly projecting member 62 is joined with lever 60 and is gently curved downwardly at a slight angle with respect to the casing 12 so as to be adapted to be conveniently contacted with an index finger when the torch is held in the hand. When member 62 is pressed downwardly, actuator 58 pivots about pin 62 and forces pin 56 against the switch 52 so as to close its contacts. In this manner, when the torch 10 is held in the hand, the forefinger may act against member 62 so as to control the operation of the torch via switch 52 which supplies electrical current thereto. Welding current is carried to the torch by a flexible copper cable that is enclosed in a plastic hose so that cooling water may be circulated about the cable.

The operation of the device of the subject invention proceeds as follows. Torch 10 is gripped in one hand, with the other hand being free to manipulate the pieces to be welded. Liquid coolant is provided to chamber 22 via tubes 48, 50 and a wire of welding metal is advanced through tube 40 and terminates in tip 36 adjacent the point of the weld. Inert gas is passed through tube 42 and tube 40 so as to provide an inert gas shield to keep oxygen away from the point of the weld and to provide a shield therefor. With the device 10 held in one hand, the forefinger may manipulate member 62 so as to close switch 52 and provide a source of electric current at the point of the weld. Electric current may be selectively supplied by the selective manipulation of member 62 and thus the control of miniature switch 52 so that with one hand the welding torch may be held, manipulated, and the source of electrical operating current controlled.

By using a device such as torch 10 of the present invention, the disadvantages of the cumbersome two-handed devices of the prior art may be easily overcome. This miniature torch may be used to weld relatively thin gauged material (i.e., material of the order of 20 mils in thickness) with very good results and likewise it may be used where only heliarc welding (i.e., tungsten helium gas welding) has heretofore only been employable. Such a torch may be successfully used to weld aluminum metal as well. While it is preferred that liquid coolant be circulated through chamber 22 so as to cool the welding torch, cooling gas such as air may also be circulated under pressure through first chamber 22 so as to provide a source of cooling.

I claim:

1. A miniaturized metal inert gas welding torch comprising in combination:
   a longitudinal casing;
   a working tip extending from one end of the longitudinal casing at an angle of less than about 90°, with the working tip including:
       an annular chamber defining member connected at one end to the longitudinal casing;
       wall means disposed within the annular chamber defining member so as to define between the longitudinal casing and the wall means a first chamber; and
       contact means joined to the opposite end of the chamber defining member forming between the contact means and the wall member a second chamber and the contact means having a center opening and at least one peripheral opening communicating with the second chamber,
   a first tube passing through the longitudinal casing, the first chamber and the wall means and communicating with the second chamber,
   the first tube being adapted to permit welding wire to be sequentially advanced therethrough and through the center opening in the contact means to the point at which the weld is to be formed;
   the first tube being further adapted to admit an inert gas to the second chamber and thence through the peripheral opening in the contact means so as to provide an inert gas shield at the point at which the weld is formed;
   coolant circulating means adapted to provide a continuous circulating flow of coolant through the first chamber;
   switch means disposed within the longitudinal casing;
   switch actuator means projecting out of the casing and having a forwardly projecting actuator lever; and
   a source of electrical current.

2. A welding torch, as claimed in claim 1, wherein the contact means comprises:
   an annular contact tip holder joined to the chamber defining member and having a center opening and a plurality of peripheral openings therein communicating with the second chamber; and
   a removable hollow cylindrical tip one end of which is positioned about the contact tip holder defining therein a passageway for the inert gas and the welding wire.

3. A welding torch, as claimed in claim 1, wherein the working tip projects from the longitudinal casing at an angle of about 30—45°.

4. A welding torch, as claimed in claim 1, wherein the coolant circulating means comprises second and third tubes passing through the longitudinal casing, the said second and third tubes each communicating with the first chamber.

5. A welding torch, as claimed in claim 1, and further comprising an auxiliary inert gas tube joined to the first tube within the longitudinal casing, with the auxiliary tube being adapted for connection with a source of inert gas.

6. A welding torch, as claimed in claim 1, wherein the switch actuator means comprises a forwardly projecting downwardly curved member adapted to be contacted by the index finger when the torch is held in the hand.

7. A welding torch, as claimed in claim 1, wherein the longitudinal casing is a generally hollow cylinder.

8. A welding torch, as claimed in claim 1, wherein the annular chamber defining member is tapered such that the diameter of the first chamber is greater than that of the second chamber.